US012111694B2

(12) United States Patent
Huang et al.

(10) Patent No.: US 12,111,694 B2
(45) Date of Patent: Oct. 8, 2024

(54) DISPLAY PANEL AND DISPLAY TERMINAL

(71) Applicant: HUIZHOU CHINA STAR OPTOELECTRONICS DISPLAY CO., LTD., Huizhou (CN)

(72) Inventors: Yichun Huang, Huizhou (CN); Kanmeng Wang, Huizhou (CN); Cen Yi, Huizhou (CN)

(73) Assignee: HUIZHOU CHINA STAR OPTOELECTRONICS DISPLAY CO., LTD., Huizhou (CN)

( * ) Notice: Subject to any disclaimer, the term of this patent is extended or adjusted under 35 U.S.C. 154(b) by 393 days.

(21) Appl. No.: 17/615,217

(22) PCT Filed: Nov. 5, 2021

(86) PCT No.: PCT/CN2021/129089
§ 371 (c)(1),
(2) Date: Nov. 30, 2021

(87) PCT Pub. No.: WO2023/070734
PCT Pub. Date: May 4, 2023

(65) Prior Publication Data
US 2023/0350460 A1  Nov. 2, 2023

(30) Foreign Application Priority Data
Oct. 26, 2021  (CN) .......................... 202111245996.9

(51) Int. Cl.
*G06F 1/16*  (2006.01)
(52) U.S. Cl.
CPC .................................. *G06F 1/1652* (2013.01)

(58) Field of Classification Search
CPC ... G02F 1/133; G02F 1/1333; G02F 1/133308
See application file for complete search history.

(56) References Cited

U.S. PATENT DOCUMENTS 6,332,690 B1    12/2001  Murofushi
7,667,891 B2 *   2/2010  Cok .................... G03B 21/56
                                              345/82

(Continued)

FOREIGN PATENT DOCUMENTS

CN      103424913 A    12/2013
CN      104347012 A     2/2015
(Continued)

OTHER PUBLICATIONS

PCT International Search Report for International Application No. PCT/CN2021/129089, mailed on Jun. 23, 2022, 17pp.

(Continued)

*Primary Examiner* — Anthony Q Edwards
(74) *Attorney, Agent, or Firm* — The Roy Gross Law Firm, LLC; Roy Gross

(57) ABSTRACT

A display panel and a display terminal are provided. An arc line segment having a plurality of radii of curvature is used, and the radius of curvature of the arc line segment gradually decreases in a direction away from a center of the arc line segment, so that degumming stress and forming stress caused by bending deformation of the display panel can be reduced, and an angle between each linear segment and a tangent plane at the center of the arc line segment is reduced simultaneously, thereby resolving a problem of serious light leakage at a periphery of an existing display panel due to deformation.

20 Claims, 5 Drawing Sheets

(56) References Cited

U.S. PATENT DOCUMENTS

| | | | |
|---|---|---|---|
| 9,483,964 B2 * | 11/2016 | Choi | G09F 9/30 |
| 9,864,222 B2 * | 1/2018 | Shao | H05K 7/1417 |
| 2007/0103776 A1 | 5/2007 | Cok et al. | |
| 2013/0321740 A1 * | 12/2013 | An | H05K 5/0017 361/679.01 |
| 2016/0320657 A1 * | 11/2016 | Shao | H05K 7/1417 |
| 2019/0187506 A1 | 6/2019 | Yun et al. | |
| 2021/0132652 A1 | 5/2021 | Kim et al. | |
| 2024/0036369 A1 * | 2/2024 | Zhang | G02F 1/133391 |
| 2024/0053629 A1 * | 2/2024 | Burdette | G02F 1/133308 |

FOREIGN PATENT DOCUMENTS

| | | |
|---|---|---|
| CN | 104570448 A | 4/2015 |
| CN | 104978900 A | 10/2015 |
| CN | 106338851 A | 1/2017 |
| CN | 109975915 A | 7/2019 |
| CN | 209803491 U | 12/2019 |
| CN | 111008501 A | 4/2020 |
| JP | 2013235241 A | 11/2013 |

OTHER PUBLICATIONS

PCT Written Opinion of the International Searching Authority for International Application No. PCT/CN2021/129089, mailed on Jun. 23, 2022, 7pp.

Chinese Office Action issued in corresponding Chinese Patent Application No. 202111245996.9 dated Mar. 25, 2023, pp. 1-12, 30pp.

\* cited by examiner

DISPLAY PANEL AND DISPLAY TERMINAL

CROSS REFERENCE TO RELATED APPLICATIONS

This application is a National Phase of PCT Patent Application No. PCT/CN2021/129089 having International filing date of Nov. 5, 2021, which claims the benefit of priority of Chinese Patent Application No. 202111245996.9, filed Oct. 26, 2021, the contents of which are all incorporated herein by reference in their entirety.

FIELD OF INVENTION

The present disclosure relates to the field of display technologies, and in particular, to a display panel and a display terminal.

BACKGROUND OF INVENTION

With the advance of technologies, curved display device products such as curved televisions and curved mobile phones have been widely used due to completely different visual experience from flat-plane display devices. The design of the curved display device is more in line with the physiological structure of human eyes than the plane display device, which can offer a distortion-free visual experience, to relieve eye fatigue of a viewer, and improving comfort.

Liquid crystal panels of existing curved televisions or other curved liquid crystal displays generally adopt a three-segment design: linear segment-circular arc segment-linear segment. The circular arc segment is a continuous circular arc with a uniform radius of R2, that is, curvatures throughout the circular arc segment are uniform, so that a distance between eyes and a picture can remain the same. However, the curved liquid crystal panel has bending stress due to bending deformation, and bending stress and degumming stress increase sharply especially at a position where the linear segment is tangent to the circular arc segment, and the panel has a risk of deformation and degumming, resulting in a serious light leakage in the region.

SUMMARY OF INVENTION

Technical Problem

Embodiments of the present disclosure provide a display panel and a display terminal, to resolve a problem of dark-state light leakage at four corners of an existing display panel.

Technical Solution

To achieve the foregoing objective, an embodiment of the present disclosure provides a display panel, wherein a cross section of the display panel includes an arc line segment and two linear segments symmetrically distributed on two ends of the arc line segment and tangent to the arc line segment; and
the arc line segment has a plurality of radii of curvature, and the radius of curvature of the arc line segment gradually decreases in a direction away from a center of the arc line segment.

In the display panel provided in the present embodiment of the present disclosure, a shape of the cross section of the display panel satisfies an equation:

$y = ax^4 + bx^2$, wherein a and b are both constants, X is a projection length of the display panel on a center tangent plane of the display panel, and Y is a projection length of the display panel on a plane perpendicular to the center tangent plane.

In the display panel provided in the present embodiment of the present disclosure, a length of each linear segment accounts for 15% to 25% of a total length of the two linear segments and the arc line segment, and a length of the arc line segment accounts for 50% to 70% of the total length of the two linear segments and the arc line segment.

In the display panel provided in the present embodiment of the present disclosure, an angle between each linear segment and a tangent plane at the center of the arc line segment ranges from 9° to 12°.

In the display panel provided in the present embodiment of the present disclosure, the length of each linear segment accounts for 15% of the total length of the two linear segments and the arc line segment, and the length of the arc line segment accounts for 70% of the total length of the two linear segments and the arc line segment.

In the display panel provided in the present embodiment of the present disclosure, the radius of curvature of the arc line segment nonlinearly decreases in directions from the center of the arc line segment to the two ends of the arc line segment.

In the display panel provided in the present embodiment of the present disclosure, the arc line segment includes a plurality of arc line subsegments, and in the direction away from the center of the arc line segment and in any two arc line subsegments:
a change rate of a radius of curvature of the arc line subsegment away from the center of the arc line segment is less than a change rate of a radius of curvature of the other arc line subsegment close to the center of the arc line segment.

In the display panel provided in the present embodiment of the present disclosure, the radius of curvature of the arc line segment linearly decreases in directions from the center of the arc line segment to the two ends of the arc line segment.

In the display panel provided in the present embodiment of the present disclosure, the arc line segment includes a plurality of arc line subsegments, and in the direction away from the center of the arc line segment and in any two arc line subsegments:
a change rate of a radius of curvature of the arc line subsegment away from the center of the arc line segment is equal to a change rate of a radius of curvature of the other arc line subsegment close to the center of the arc line segment.

In the display panel provided in the present embodiment of the present disclosure, the cross section of the display panel is a continuous curved surface, a radius of curvature of the curved surface is 1500 mm, and the radius of curvature of the arc line segment ranges from 1200 mm to 1300 mm.

An embodiment of the present disclosure provides a display terminal, including a terminal body and a display panel, wherein the terminal body and the display panel are integrally combined, and a cross section of the display panel includes an arc line segment and two linear segments symmetrically distributed on two ends of the arc line segment and tangent to the arc line segment; and
the arc line segment has a plurality of radii of curvature, and the radius of curvature of the arc line segment gradually decreases in a direction away from a center of the arc line segment.

In the display terminal provided in the present embodiment of the present disclosure, a shape of the cross section of the display panel satisfies an equation:

$y=ax^4+bx^2$, wherein a and b are both constants, X is a projection length of the display panel on a center tangent plane of the display panel, and Y is a projection length of the display panel on a plane perpendicular to the center tangent plane.

In the display terminal provided in the present embodiment of the present disclosure, a length of each linear segment accounts for 15% to 25% of a total length of the two linear segments and the arc line segment, and a length of the arc line segment accounts for 50% to 70% of the total length of the two linear segments and the arc line segment.

In the display terminal provided in the present embodiment of the present disclosure, an angle between each linear segment and a tangent plane at the center of the arc line segment ranges from 9° to 12°.

In the display terminal provided in the present embodiment of the present disclosure, the length of each linear segment accounts for 15% of the total length of the two linear segments and the arc line segment, and the length of the arc line segment accounts for 70% of the total length of the two linear segments and the arc line segment.

In the display terminal provided in the present embodiment of the present disclosure, the radius of curvature of the arc line segment nonlinearly decreases in directions from the center of the arc line segment to the two ends of the arc line segment.

In the display terminal provided in the present embodiment of the present disclosure, the arc line segment includes a plurality of arc line subsegments, and in the direction away from the center of the arc line segment and in any two arc line subsegments:

a change rate of a radius of curvature of the arc line subsegment away from the center of the arc line segment is less than a change rate of a radius of curvature of the other arc line subsegment close to the center of the arc line segment.

In the display terminal provided in the present embodiment of the present disclosure, the radius of curvature of the arc line segment linearly decreases in directions from the center of the arc line segment to the two ends of the arc line segment.

In the display terminal provided in the present embodiment of the present disclosure, the arc line segment includes a plurality of arc line subsegments, and in the direction away from the center of the arc line segment and in any two arc line subsegments:

a change rate of a radius of curvature of the arc line subsegment away from the center of the arc line segment is equal to a change rate of a radius of curvature of the other arc line subsegment close to the center of the arc line segment.

In the display terminal provided in the present embodiment of the present disclosure, the cross section of the display panel is a continuous curved surface, a radius of curvature of the curved surface is 1500 mm, and the radius of curvature of the arc line segment ranges from 1200 mm to 1300 mm.

Beneficial Effects

The present disclosure provides a display panel and a display terminal. A cross section of the display panel includes an arc line segment and two linear segments symmetrically distributed on two ends of the arc line segment and tangent to the arc line segment. Instead of a design of a circular arc segment with a uniform curvature in the prior art, the arc line segment having a plurality of radii of curvature is used, and the radius of curvature of the arc line segment gradually decreases in a direction away from a center of the arc line segment, so that degumming stress and forming stress caused by bending deformation of the display panel can be reduced, thereby resolving a problem of light leakage due to deformation of four corners of the display panel to some extent.

BRIEF DESCRIPTION OF DRAWINGS

The following describes specific implementations of the present disclosure in detail with reference to the accompanying drawings, to make the technical solutions and other beneficial effects of the present disclosure obvious.

DETAILED DESCRIPTION OF PREFERRED EMBODIMENTS

The present disclosure provides a display panel and a display terminal. To make the objectives, technical solutions, and effects of the present disclosure clearer and more comprehensible, the following further describes the present disclosure in detail with reference to the accompanying drawings and embodiments. It should be understood that the detailed embodiments described herein are merely used to describe the present disclosure, instead of limiting the present disclosure.

Embodiments of the present disclosure provide a display panel and a display terminal. Detailed descriptions are separately provided below. It should be noted that a description sequence of the following embodiments is not intended to limit preference orders of the embodiments.

Figure 1:
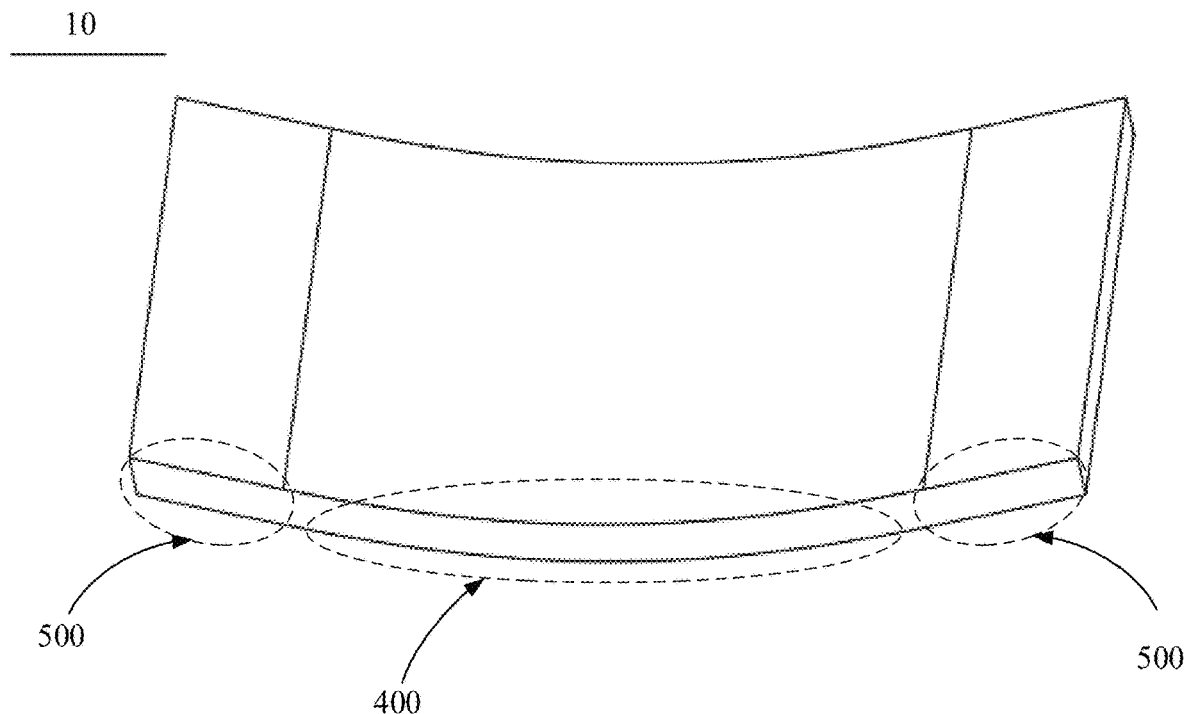
FIG. 1 is a schematic diagram of a first structure of an existing display panel.
Figure 2:
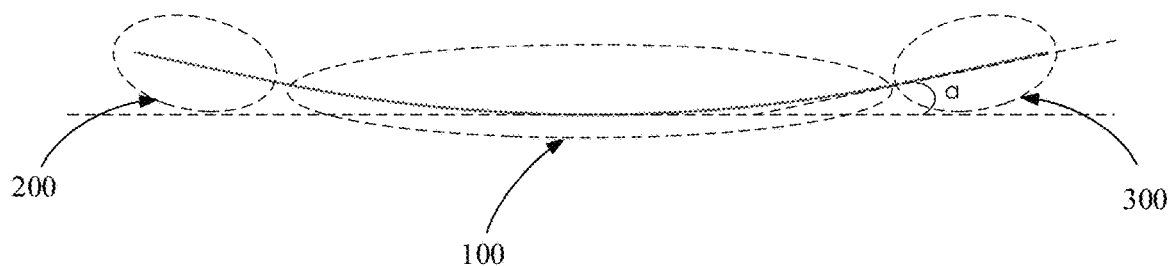
FIG. 2 is a schematic diagram of a cross section of the display panel shown in FIG. 1.
Figure 3:
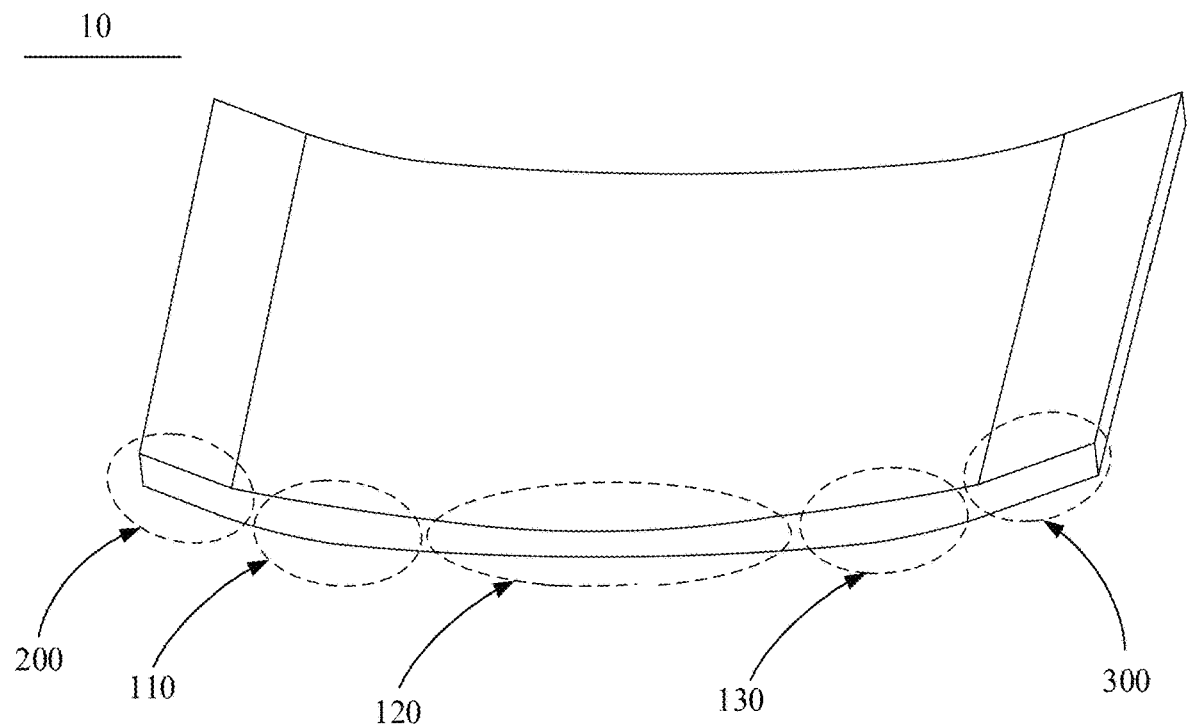
FIG. 3 is a schematic diagram of a second structure of an existing display panel.
Figure 4:
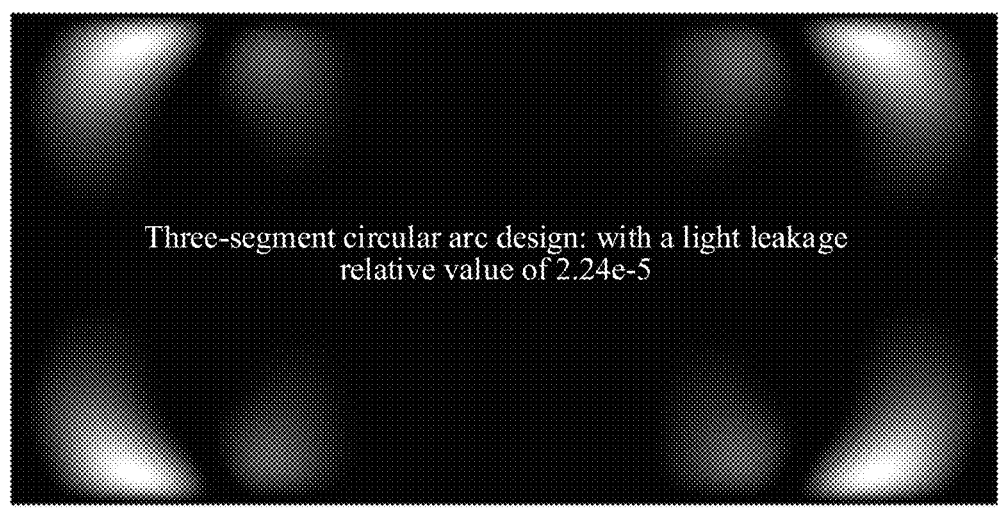
FIG. 4 is a schematic diagram of a light leakage phenomenon when black picture display is performed on the display panel shown in FIG. 3.

Referring to FIG. 1, FIG. 2, FIG. 3, and FIG. 4, FIG. 1 is a schematic diagram of a first structure of an existing display panel 10; FIG. 2 is a schematic diagram of a cross section of the display panel 10 shown in FIG. 1; FIG. 3 is a schematic diagram of a second structure of an existing display panel 10; and FIG. 4 is a schematic diagram of a light leakage phenomenon when black picture display is performed on the display panel 10 shown in FIG. 3.

In the prior art, the curved display panel 10 generally adopts a three-segment design: a first linear segment 200, a circular arc segment 100, and a second linear segment 300 (as shown in FIG. 1). The first linear segment 200 and the second linear segment 300 are symmetrically distributed on two ends of the circular arc segment 100, the first linear segment 200 is tangent to the circular arc segment 100, and the second linear segment 300 is tangent to the circular arc segment 100. The circular arc segment 100 is a continuous circular arc with a uniform radius of R1, that is, a radius of curvature throughout the circular arc segment is uniform, so that a distance between eyes and a picture can remain the same. However, the curved display panel 10 has bending stress due to bending deformation, especially at a position where the first linear segment 200 is tangent to the circular arc segment 100 and a position where the second linear segment 300 is tangent to the circular arc segment 100. In addition, because both angles α between a tangent plane of a center of the circular arc segment 100 and the first linear segment 200 as well as the second linear segment 300 are relatively large (as shown in FIG. 2), forming stress and degumming stress of the display panel 10 at the positions increase sharply, and the panel has a risk of deformation and degumming, resulting in a serious dark-state light leakage at four corners of the display panel 10.

To reduce the forming stress and the degumming stress at the position where the first linear segment 200 is tangent to the circular arc segment 100 and the forming stress and the degumming stress at the position where the second linear segment 300 is tangent to the circular arc segment 100, the display panel 10 is provided in the prior art. The circular arc segment 100 includes a first circular arc segment 110, a second circular arc segment 120, and a third circular arc segment 130 (as shown in FIG. 3), a radius R2 of the first circular arc segment 110 is equal to a radius R4 of the third circular arc segment 130, and a radius R3 of the second circular arc segment 120 is greater than the radius R2 of the first circular arc segment 110. The radius of the circular arc segment 100 tangent to the first linear segment 200 and the second linear segment 300 is reduced, to reduce the forming stress and the degumming stress at the position where the first linear segment 200 is tangent to the circular arc segment 100 and the forming stress and the degumming stress at the position where the second linear segment 300 is tangent to the circular arc segment 100. However, when black picture display is performed on the display panel 10 in the three-segment circular arc design, it can be learned according to an obtained light leakage relative value of 2.24e-5 and a picture display effect that an effect of alleviating dark-state light leakage at the four corners of the existing display panel 10 is not significant (as shown in FIG. 4). Based on this, the present disclosure provides a display panel and a display terminal, to resolve the problem of dark-state light leakage at the four corners of the existing display panel.

Referring to FIG. 5 to FIG. 10, the present disclosure provides a display panel 10 and a display terminal. A cross section of the display panel 10 includes an arc line segment 400 and two linear segments 500 symmetrically distributed on two ends of the arc line segment 400 and tangent to the arc line segment 400. The arc line segment 400 has a plurality of radii of curvature, and the radius of curvature of the arc line segment 400 gradually decreases in a direction away from a center of the arc line segment 400.

The present disclosure provides a display panel 10 and a display terminal. A cross section of the display panel 10 includes an arc line segment 400 and two linear segments 500 symmetrically distributed on two ends of the arc line segment 400 and tangent to the arc line segment 400. The arc line segment 400 having a plurality of radii of curvature is disposed, and the radius of curvature of the arc line segment 400 gradually decreases in a direction away from a center of the arc line segment 400, so that bending stress caused by bending deformation of the display panel 10 can be reduced, thereby resolving the problem of light leakage due to deformation of the four corners of the display panel 10 to some extent.

The technical solution of the present disclosure is described with reference to the detailed embodiments.

Figure 5:
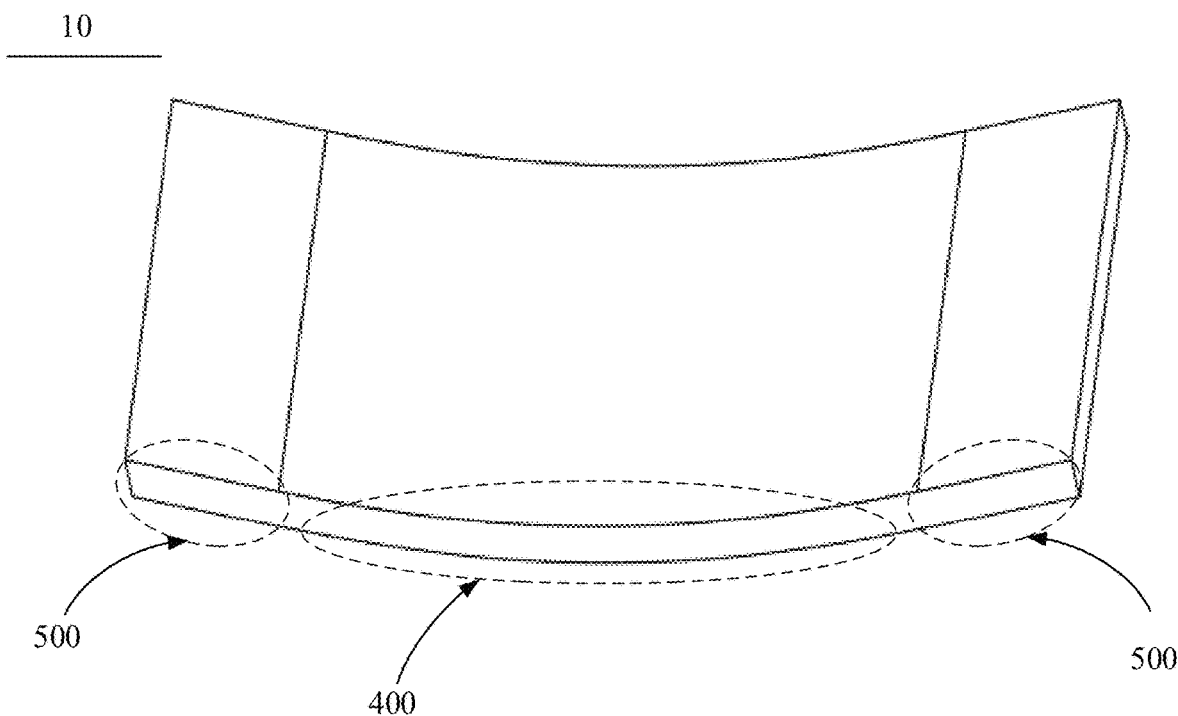
FIG. 5 is a schematic diagram of a structure of a display panel according to an embodiment of the present disclosure.
Figure 6:
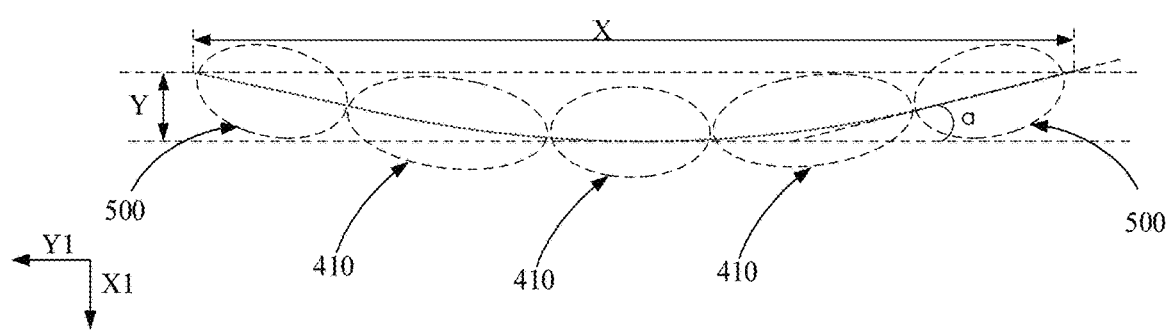
FIG. 6 is a schematic diagram of a first structure of a cross section of a display panel according to an embodiment of the present disclosure.

Referring to FIG. 1, FIG. 5, and FIG. 6, FIG. 5 is a schematic diagram of a structure of a display panel 10 according to an embodiment of the present disclosure; and FIG. 6 is a schematic diagram of a first structure of a cross section of a display panel according to an embodiment of the present disclosure.

An embodiment of the present disclosure provides a display panel 10. The display panel 10 includes, but is not limited to, a light emitting diode (LED) display panel 10, and the display panel 10 includes, but is not limited to, conventional film layers such as a gate, an insulation layer, an active layer, and a source and drain layer that are stacked in sequence. Details are not described in the present embodiment. It should be noted that, the technical solution of the present disclosure is described using an example in which the display panel 10 is an LED display panel in the present embodiment.

In the present embodiment, a cross section of the display panel 10 includes an arc line segment 400 and two linear segments 500 symmetrically distributed on two ends of the arc line segment 400 and tangent to the arc line segment 400. A shape of the cross section of the display panel 10 satisfies an equation: $y=ax^4+bx^2$, wherein a and b are both constants, X is a projection length of the display panel on a center tangent plane of the display panel, and Y is a projection length of the display panel on a plane perpendicular to the center tangent plane. It should be noted that, a and b may be set in a mathematical fitting manner according to a set radius of curvature and are constants after curve optimization. The projection length of the display panel on the center tangent plane of the display panel is a projection length of the display panel in a first direction X1, and the projection length of the display panel on the plane perpendicular to the center tangent plane is a projection length of the display panel in a second direction Y1. As shown in FIG. 6, the first direction X1 is perpendicular to the second direction Y1.

In the present embodiment, the arc line segment 400 has a plurality of radii of curvature, and the radius of curvature of the arc line segment 400 gradually decreases in a direction away from a center of the arc line segment 400. It may be understood that in the present embodiment, the arc line segment 400 having a plurality of radii of curvature is used instead of a design of the circular arc segment 100 with a uniform curvature in the prior art, so that degumming stress and forming stress caused by bending deformation of the display panel 10 can be reduced. In addition, in the present embodiment, in the direction away from the center of the arc line segment 400, the radius of curvature of the arc line segment 400 gradually decreases, to reduce an angle α between each linear segment 500 and a tangent plane at the center of the arc line segment 400, thereby resolving the problem of serious light leakage at a periphery of the existing display panel 10 due to deformation. In addition, in the present embodiment, the cross section of the display panel 10 is the arc line segment 400 having the plurality of radii of curvature, so that a better viewing angle can be obtained using the display panel 10.

In the present embodiment, the radius of curvature of the arc line segment 400 nonlinearly decreases in directions from the center of the arc line segment 400 to the two ends of the arc line segment 400.

Specifically, in the technical solution of the display panel 10 provided in the present embodiment, the arc line segment 400 includes a plurality of arc line subsegments 410. In the direction away from the center of the arc line segment 400, and in any two arc line subsegments 410: a change rate of a radius of curvature of the arc line subsegment 410 away from the center of the arc line segment 400 is less than a change rate of a radius of curvature of the other arc line subsegment 410 close to the center of the arc line segment 400. It may be understood that in the present embodiment, the arc line segment 400 with a radius of non-uniform curvature is used instead of the circular arc segment 100 with a uniform curvature in the prior art, so that the degumming stress and the forming stress caused by bending deformation of the display panel 10 can be reduced, thereby resolving the problem of light leakage due to deformation of the four corners of the display panel 10 to some extent.

Figure 7:
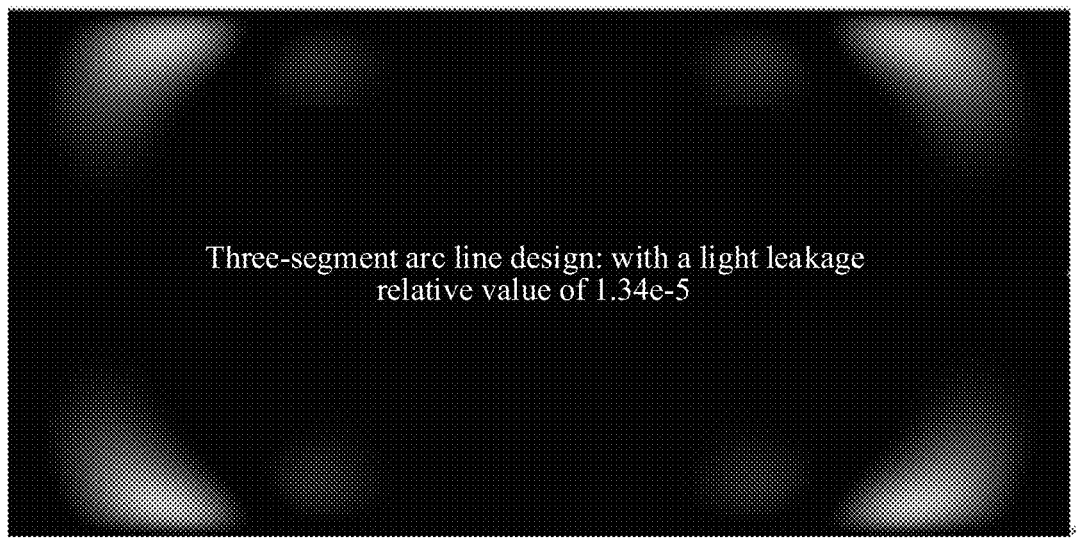
FIG. 7 is a schematic diagram of a light leakage phenomenon when black picture display is performed on a display panel according to an embodiment of the present disclosure.

Referring to FIG. 5, FIG. 6, and FIG. 7, FIG. 7 is a schematic diagram of a light leakage phenomenon when black picture display is performed on a display panel according to an embodiment of the present disclosure.

In the present embodiment, a length of each linear segment 500 accounts for 15% to 25% of a total length of the two linear segments 500 and the arc line segment 400, and a length of the arc line segment 400 accounts for 50% to 70% of the total length of the two linear segments 500 and the arc line segment 400.

Further, in the technical solution of the display panel 10 provided in the present embodiment, an angle between each linear segment 500 and a tangent plane at the center of the arc line segment 400 ranges from 9° to 12°. The radius of curvature of the arc line segment 400 ranges from 1200 mm to 1300 mm.

Specifically, in the technical solution of the display panel 10 provided in the present embodiment, the length of each linear segment 500 accounts for 15% of the total length of the two linear segments 500 and the arc line segment 400, and the length of the arc line segment 400 accounts for 70% of the total length of the two linear segments 500 and the arc line segment 400, and a radius of an arc drawn using three points of endpoints of the two linear segments 500 and a midpoint of the arc line segment is 1500 mm. That is, in the present embodiment, the technical solution of the present disclosure is described using an example in which the cross section of the display panel 10 is a continuous curved surface and a radius of curvature of the curved surface is 1500 mm. The technical solution of the present disclosure is described using an example in which the length of each linear segment 500 accounts for 15% of the total length of the two linear segments 500 and the arc line segment 400, and the length of the arc line segment 400 accounts for 70% of the total length of the two linear segments 500 and the arc line segment 400.

It may be understood that as shown in FIG. 7, as can be learned according to an obtained light leakage relative value of 1.34e-5 and a picture display effect, the problem of dark-state light leakage at the four corners of the existing display panel 10 is resolved. In addition, an optical grade of curve display can further be improved by using the display panel 10 provided in the present embodiment, and product competitiveness is increased.

It should be noted that, in the present embodiment, a size of the angle between each linear segment 500 and the tangent plane at the center of the arc line segment 400 is related to a proportion of the length of each linear segment 500 to the total length of the two linear segments 500 and the arc line segment 400, the display panels 10 of different sizes have different optimal proportions, and amounts of light leakage in regions are also different. When the display panel 10 has an optimal proportion of the length of each linear segment 500 to the total length of the two linear segments 500 and the arc line segment 400, a degumming stress action and a forming stress action concentrated on the four corners of the display panel 10 may be alleviated, the problem of dark-state light leakage of the four corners of the display panel 10 is resolved, and nonuniformity of brightness of a display region of the display panel 10 can further be avoided.

It may be understood that in the present embodiment, the length of each linear segment 500 accounts for 15% to 25% of the total length of the two linear segments 500 and the arc line segment 400, the length of the arc line segment 400 accounts for 50% to 70% of the total length of the two linear segments 500 and the arc line segment 400, and the angle between each linear segment 500 and the tangent plane at the center of the arc line segment 400 ranges from 9° to 12°. Compared with the existing display panel 10, the angle α between each linear segment 500 and the tangent plane at the center of the arc line segment 400 is reduced in the display panel 10 provided in the present disclosure, thereby resolving the problem of serious light leakage at a periphery of the existing display panel 10 due to deformation.

Figure 8:
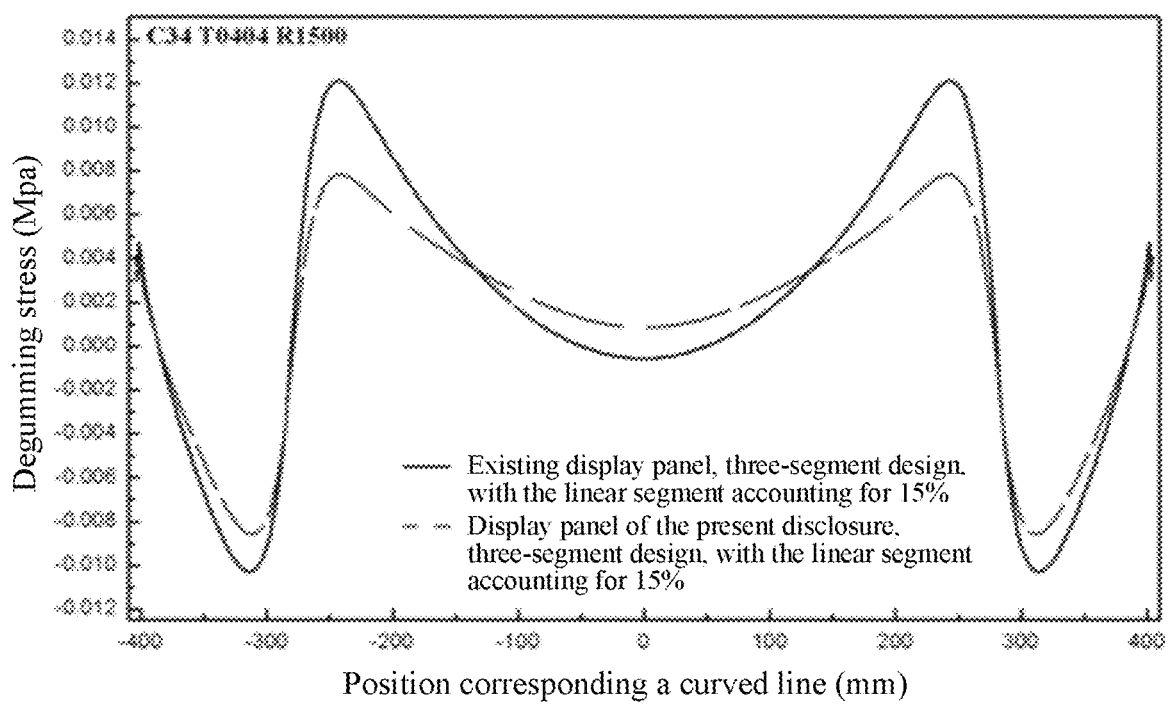
FIG. 8 is a diagram of comparison between degumming stress of a display panel and degumming stress of an existing display panel according to an embodiment of the present disclosure.
Figure 9:
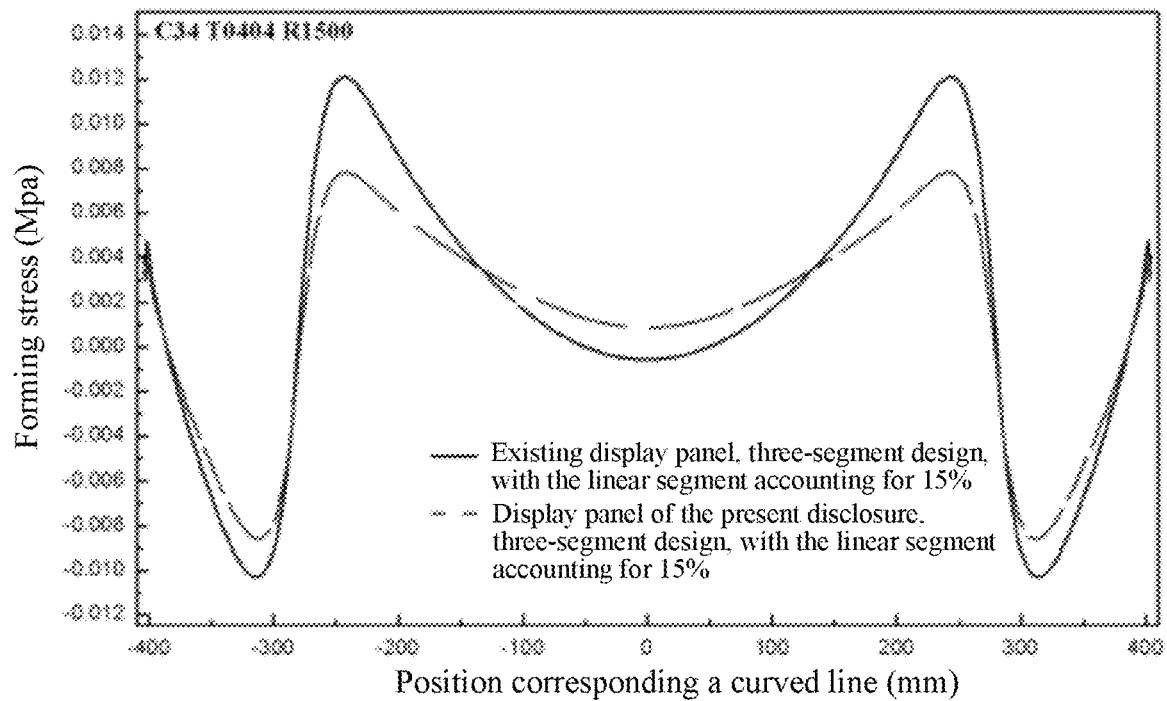
FIG. 9 is a diagram of comparison between forming stress of a display panel and forming stress of an existing display panel according to an embodiment of the present disclosure.

Referring to FIG. 1, FIG. 5, FIG. 8, and FIG. 9, FIG. 8 is a diagram of comparison between degumming stress of a display panel and degumming stress of an existing display panel according to an embodiment of the present disclosure, and FIG. 9 is a diagram of comparison between forming stress of a display panel and forming stress of an existing display panel according to an embodiment of the present disclosure.

It should be noted that, in the present embodiment, the length of each linear segment 500 accounts for 15% of the total length of the two linear segments 500 and the arc line segment 400, and the length of the arc line segment 400 accounts for 70% of the total length of the two linear segments 500 and the arc line segment 400. In the existing display panel 10, a length of each linear segment 500 accounts for 15% of a total length of the two linear segments 500 and the circular arc segment 100, and a length of the circular arc segment 100 accounts for 70% of the total length of the two linear segments 500 and the circular arc segment 100.

It can be learned from FIG. 8 and FIG. 9 that in the present embodiment, the arc line segment 400 with a radius of non-uniform curvature is used instead of the circular arc segment 100 with a uniform curvature, a transition between the arc line segment 400 and the two linear segments 500 is smooth, and the radius of curvature of the arc line segment 400 gradually decreases in a direction away from the center of the arc line segment 400, to reduce sharp stress change and reduce a relatively large degumming stress action and a relatively large forming stress action generated on the existing display panel 10, thereby resolving the problem of light leakage due to deformation of the four corners of the display panel 10 to some extent.

Figure 10:
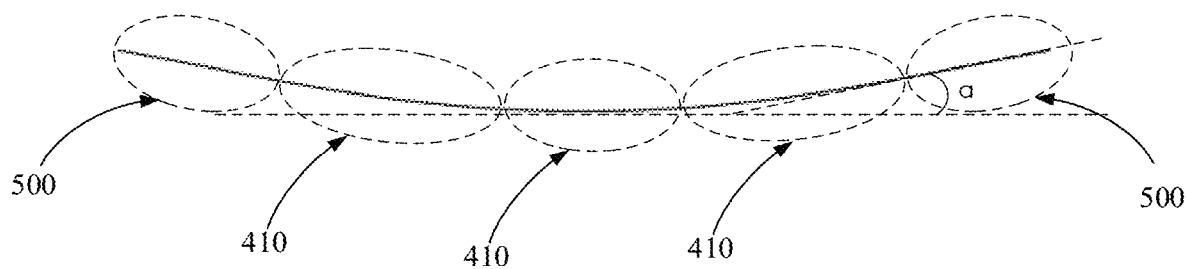
FIG. 10 is a schematic diagram of a second structure of a cross section of a display panel according to an embodiment of the present disclosure.

FIG. 10 is a schematic diagram of a second structure of a cross section of a display panel according to an embodiment of the present disclosure.

In the present embodiment, the schematic diagram of the structure of the cross section of the display panel 10 is similar to/same as the first structure of the cross section of the display panel 10 provided in the above embodiments, and for details, reference is made to a description of the display panel 10 in the above embodiments. Details are not described herein again. A difference between the two lies in that:

in the display panel 10 provided in the present embodiment of the present disclosure, the radius of curvature of the arc line segment 400 linearly decreases in directions from the center of the arc line segment 400 to the two ends of the arc line segment 400.

Specifically, in the technical solution of the display panel 10 provided in the present embodiment, the arc line segment 400 includes a plurality of arc line subsegments 410. In the direction away from the center of the arc line segment 400 and in any two arc line subsegments 410: a change rate of a radius of curvature of the arc line subsegment 410 away from the center of the arc line segment 400 is equal to a change rate of a radius of curvature of the other arc line subsegment 410 close to the center of the arc line segment 400.

It may be understood that in the present embodiment, the radius of curvature of the arc line segment 400 linearly decreases in the directions from the center of the arc line segment 400 to the two ends of the arc line segment 400, so that bending stress caused by bending deformation of the display panel 10 can be reduced, thereby resolving the problem of light leakage due to deformation of the four corners of the display panel 10 to some extent. In addition, the radius of curvature of the arc line segment 400 linearly decreases, so that brightness in the display region of the display panel 10 is uniform. In addition, compared with the display panel 10 having the arc line segment 400 with a radius of non-uniform curvature provided in the above embodiments, in the present embodiment, the display panel 10 having the arc line segment 400 with a radius of uniform curvature is used, and a requirement on manufacturing process precision is relatively low, thereby facilitating processing and manufacturing.

The present embodiment provides a display terminal, including a terminal body and the display panel according to any one of the above embodiments, wherein the terminal body and the display panel are integrally combined.

It may be understood that the display panel has been described in the above embodiments in detail, and details are not repeated herein again.

During specific application, the display terminal includes, but is not limited to, a display screen of a smart television. This is not specifically limited in the present embodiment.

Based on the foregoing, the present disclosure provides a display panel and a display terminal. A cross section of the display panel includes an arc line segment and two linear segments symmetrically distributed on two ends of the arc line segment and tangent to the arc line segment; and the arc line segment has a plurality of radii of curvature, and the radius of curvature of the arc line segment gradually decreases in a direction away from a center of the arc line segment. In the present disclosure, the arc line segment having a plurality of radii of curvature is used instead of a design of a circular arc segment with a uniform curvature, so that degumming stress and forming stress caused by bending deformation of the display panel can be reduced. In addition, in a direction away from a center of the arc line segment, the radius of curvature of the arc line segment gradually decreases, to reduce an angle between each linear segment and a tangent plane at the center of the arc line segment, thereby resolving a problem of serious light leakage at a periphery of the existing display panel due to deformation.

It may be understood that a person of ordinary skill in the art can make equivalent replacement or modifications according to the technical solution and the inventive concept of the present disclosure, and all of the replacements and modifications should all fall within the protection scope of the attached claims of the present disclosure.

What is claimed is:

1. A display panel, wherein a cross section of the display panel comprises an arc line segment and two linear segments symmetrically distributed on two ends of the arc line segment and tangent to the arc line segment; and the arc line segment has a plurality of radii of curvature, and the radius of curvature of the arc line segment gradually decreases in a direction away from a center of the arc line segment, wherein a length of each linear segment accounts for 15% to 25% of a total length of the two linear segments and the arc line segment, and a length of the arc line segment accounts for 50% to 70% of the total length of the two linear segments and the arc line segment.

2. The display panel as claimed in claim 1, wherein a shape of the cross section of the display panel satisfies an equation:

$y=ax^4+bx^2$, wherein a and b are both constants, X is a projection length of the display panel on a center tangent plane of the display panel, and Y is a projection length of the display panel on a plane perpendicular to the center tangent plane.

3. The display panel as claimed in claim 1, wherein an angle between each linear segment and a tangent plane at the center of the arc line segment ranges from 9° to 12°.

4. The display panel as claimed in claim 1, wherein the length of each linear segment accounts for 15% of the total length of the two linear segments and the arc line segment, and the length of the arc line segment accounts for 70% of the total length of the two linear segments and the arc line segment.

5. The display panel as claimed in claim 1, wherein the radius of curvature of the arc line segment nonlinearly decreases in directions from the center of the arc line segment to the two ends of the arc line segment.

6. The display panel as claimed in claim 5, wherein the arc line segment comprises a plurality of arc line subsegments, and in the direction away from the center of the arc line segment and in any two arc line subsegments:

a change rate of a radius of curvature of the arc line subsegment away from the center of the arc line segment is less than a change rate of a radius of curvature of the other arc line subsegment close to the center of the arc line segment.

7. The display panel as claimed in claim 1, wherein the radius of curvature of the arc line segment linearly decreases in directions from the center of the arc line segment to the two ends of the arc line segment.

8. The display panel as claimed in claim 7, wherein the arc line segment comprises a plurality of arc line subsegments, and in the direction away from the center of the arc line segment and in any two arc line subsegments:

a change rate of a radius of curvature of the arc line subsegment away from the center of the arc line segment is equal to a change rate of a radius of curvature of the other arc line subsegment close to the center of the arc line segment.

9. The display panel as claimed in claim 1, wherein the cross section of the display panel is a continuous curved surface, a radius of curvature of the curved surface is 1500 mm, and the radius of curvature of the arc line segment ranges from 1200 mm to 1300 mm.

10. A display terminal, comprising a terminal body and a display panel, wherein the terminal body and the display panel are integrally combined, and a cross section of the display panel comprises an arc line segment and two linear segments symmetrically distributed on two ends of the arc line segment and tangent to the arc line segment; and the arc line segment has a plurality of radii of curvature, and the radius of curvature of the arc line segment gradually decreases in a direction away from a center of the arc line segment, wherein a length of each linear segment accounts for 15% to 25% of a total length of the two linear segments and the arc line segment, and a length of the arc line segment accounts for 50% to 70% of the total length of the two linear segments and the arc line segment.

11. The display terminal as claimed in claim 10, wherein a shape of the cross section of the display panel satisfies an equation:

$y=ax^4+bx^2$, wherein a and b are both constants, X is a projection length of the display panel on a center tangent plane of the display panel, and Y is a projection length of the display panel on a plane perpendicular to the center tangent plane.

12. The display terminal as claimed in claim 10, wherein an angle between each linear segment and a tangent plane at the center of the arc line segment ranges from 9° to 12°.

13. The display terminal as claimed in claim 10, wherein the length of each linear segment accounts for 15% of the total length of the two linear segments and the arc line segment, and the length of the arc line segment accounts for 70% of the total length of the two linear segments and the arc line segment.

14. The display terminal as claimed in claim 10, wherein the radius of curvature of the arc line segment nonlinearly decreases in directions from the center of the arc line segment to the two ends of the arc line segment.

15. The display terminal as claimed in claim 14, wherein the arc line segment comprises a plurality of arc line subsegments, and in the direction away from the center of the arc line segment and in any two arc line subsegments:

a change rate of a radius of curvature of the arc line subsegment away from the center of the arc line segment is less than a change rate of a radius of curvature of the other arc line subsegment close to the center of the arc line segment.

16. The display terminal as claimed in claim 10, wherein the radius of curvature of the arc line segment linearly decreases in directions from the center of the arc line segment to the two ends of the arc line segment.

17. The display terminal as claimed in claim 16, wherein the arc line segment comprises a plurality of arc line subsegments, and in the direction away from the center of the arc line segment and in any two arc line subsegments:

a change rate of a radius of curvature of the arc line subsegment away from the center of the arc line segment is equal to a change rate of a radius of curvature of the other arc line subsegment close to the center of the arc line segment.

18. The display terminal as claimed in claim 10, wherein the cross section of the display panel is a continuous curved surface, a radius of curvature of the curved surface is 1500 mm, and the radius of curvature of the arc line segment ranges from 1200 mm to 1300 mm.

19. A display terminal, comprising a terminal body and a display panel, wherein the terminal body and the display panel are integrally combined, and a cross section of the display panel comprises an arc line segment and two linear segments symmetrically distributed on two ends of the arc line segment and tangent to the arc line segment; and the arc line segment has a plurality of radii of curvature, and the radius of curvature of the arc line segment gradually decreases in a direction away from a center of the arc line segment, wherein the radius of curvature of the arc line segment linearly or nonlinearly decreases in directions from the center of the arc line segment to the two ends of the arc line segment.

20. The display terminal as claimed in claim 19, wherein the arc line segment comprises a plurality of arc line subsegments, and in the direction away from the center of the arc line segment and in any two arc line subsegments:

a change rate of a radius of curvature of the arc line subsegment away from the center of the arc line segment is less than or equal to a change rate of a radius of curvature of the other arc line subsegment close to the center of the arc line segment.

\* \* \* \* \*